July 29, 1958 N. S. KORNETZ 2,845,488
AUTOMATIC SYNC LEVEL CONTROL FOR TELEVISION RECEIVERS
Filed Aug. 17, 1953
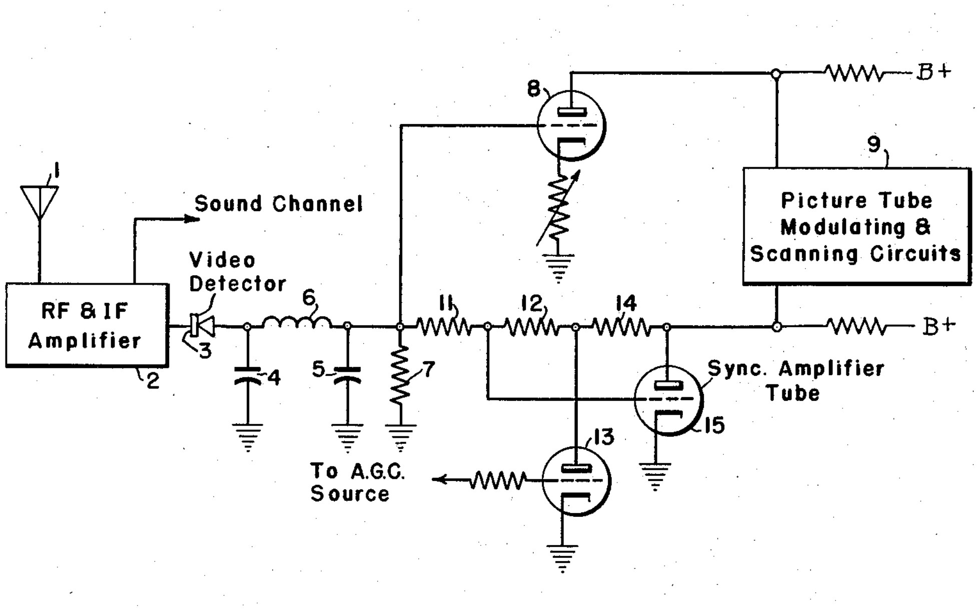
WITNESSES:
John E. Healy
R. G. Brodahl
INVENTOR
Norman S. Kornetz.
BY F. E. Browder
ATTORNEY 2,845,488

AUTOMATIC SYNC LEVEL CONTROL FOR TELEVISION RECEIVERS

Norman S. Kornetz, Lewisburg, Pa., assignor to Westinghouse Electric Corporation, East Pittsburgh, Pa., a corporation of Pennsylvania Application August 17, 1953, Serial No. 374,718

7 Claims. (Cl. 178—7.5)

My invention relates to television and other picture reproducing systems and, in particular, relates to arrangements for maintaining approximate constancy in the amplitude of the synchronizing pulse controlling the horizontal sync (i. e. synchronizing) generator notwithstanding wide variations in the level of the incoming picture signals.

It has been found that the presence of any blocking capacitance between the video detector and the video amplifier of a television receiver results in poor picture rendition and stability. This is due to the low frequency picture components being lost across such a blocking capacitor. However, these low frequency picture components may be restored by a device known in the art as a direct current restorer. The latter device as commonly employed references its produced voltage from the sync amplifier peaks, and thus is responsive to interfering noise pulses which exceed the peak amplitude of the sync. The effect of the voltage variations thus produced on the picture reproducing device is far more detrimental to the desired picture display than the initial noise pulses themselves. The latter is true since these noise pulses are in the blacker than black region. Therefore, it has become the preference of those skilled in this art to maintain a direct current connection from the video detector output to the picture tube modulating element, which obviates the necessity for providing a direct current restorer as above set forth. However, unless counter-measures are taken, such a connection results in strong picture signals crushing out and rendering the horizontal sync ineffective to control the horizontal sync generator, and the same is true relative to the vertical sync operation. One attempt at a counter-measure consisted in connecting a resistor from anode to grid of the sync amplifier to neutralize any excessive negative bias impressed on the grid by strong signals entering the second detector while also degenerating the sync amplifier; but when this resistor was so proportioned as to be adequately effective in this operation it greatly reduced the percentage of the detector output voltage which reached the grid of the sync amplifier when weak signals are entering the second detector.

My present invention comprises a circuit which permits direct-current feedback to neutralize the negative potential impressed on the sync amplifier grid when strong picture signals pass the second detector but is more effective to impress the output of the detector on the sync amplifier grid in the reception of weak picture signals by substantially reducing such direct current feedback.

One object of my invention is accordingly to provide an improved receiver for television or other picture-reproducing signals.

Another object is to provide an arrangement for automatically maintaining approximate constancy of the sync voltage in a television receiver despite wide variations of the incoming transmitted signals.

Another object is to provide television receivers with a channel between the second detector and the sync circuit which shall be conductive to direct current and at the same time shall maintain approximate constancy of the sync signals in the face of wide variations of intensity in the signals impressed on the video amplifier.

Still another object is to provide automatic control for the sync amplifier of a television receiver which shall provide a degenerative coupling varying automatically with the strength of incoming picture transmission.

Other objects of my invention will become apparent upon reading the following description taken in connection with the drawings in which the single figure is a schematic diagram of the circuits of a television receiver, embodying one form of my invention, with a detailed showing of the portion of the circuit in which the principal novel features are found.

Referring in detail to the drawings, a television receiver embodying the principles of my invention may comprise an antenna 1 feeding an R. F. and I. F. amplifier system 2 of conventional type feeding a second detector 3 having a filter comprising a pair of capacitors 4 and 5 respectively grounded at one end and joined at the other by an inductor 6. The capacitor 5 is bridged by a resistor 7 having its ungrounded end connected to the grid of a video amplifier 8 feeding picture signals to modulating channel of a picture tube in the reproducing section 9 which may be of conventional type.

The ungrounded end of resistor 7 is likewise connected through two resistors 11 and 12 to the anode of a control tube 13 having its cathode grounded and its grid connected to a conventional automatic-gain-control (hereinafter called AGC) voltage source in the receiver. The anode of tube 13 is likewise connected through a resistor 14 to the anode of a conventional sync amplifier tube 15 supplying the scanning circuits of the conventional picture tube in reproducing section 9, tube 15 having its cathode grounded and its grid connected to the common terminal of resistors 11 and 12. The resistors 12 and 14 are not greatly different in value (e. g. 12 may be 270K and 14 may be 220K) but both are much larger than 11 and 7 (which may be 12K and 3.3K).

When incoming signals to the television receiver are weak, the grid of control tube 13 is substantially at cathode potential since there is no appreciable AGC effect present, and control tube 13 in conductive. When, however, strong incoming signals impose the strong negative potentials on the ungrounded end of resistor 7, which strong signals in particular produce the difficulties described in preceding paragraphs herein, the AGC source impresses so strong a negative voltage on the grid of control tube 13 as to render the latter non-conductive. This allows direct current feedback from the anode of sync amplifier 15 to flow to the ungrounded end of resistor 7 lessening the effect of the video detector 3 in making the ungrounded end of resistor 7 negative, and also imposing a degenerative feedback voltage on the grid of sync amplifier tube 15. This tends to maintain the sync pulse transmitted by sync amplifier 15 at its desired normal value, and thus tends to maintain the level of the sync pulses substantially constant notwithstanding severe fluctuations in amplitude of the incoming picture signals.

Without the provision of control tube 13, and due to the conduction of sync amplifier tube 15, there would be a low impedance circuit between ground and the junction of resistors 11 and 12 such that weak signals at the video detector 3 are primarily across resistor 11 and insignificantly across the grid circuit of sync amplifier tube 15. However, for weak signals and with control tube 13 provided in the circuit as shown in the drawing, the grid impedance of the sync amplifier tube 15 is thereby increased, due to the low impedance path provided by conducting control tube 13, so that more of the signal voltage appears across this grid-cathode circuit of the sync amplifier tube 15.

More generally speaking, it will be seen that provided control tube 13 in effect operates as a circuit switch to selectively provide for weak signal operation a low impedance path between the junction of resistors 12 and 14 and ground, and to selectively provide a higher impedance path for strong signal operation between the latter junction and ground; such selection is effected by the AGC operation which is responsive to these weak and strong signals.

Although the invention has been described with reference to certain specific embodiments thereof, numerous modifications falling within the spirit and the scope of the invention will be readily apparent to those skilled in this art after the benefit of the above teachings has been obtained.

I claim as my invention:

1. In a television receiver, an input circuit, radio frequency and intermediate frequency signal amplifiers transmitting signals from said input circuit carrying picture modulations and sync pulses therefrom to a video detector having an output resistor, said detector being so poled that negative going sync pulses are developed across said output resistor, the circuit from said detector through said output resistor being conductive to direct current, means in said receiver deriving an AGC voltage from said input circuit, a sync amplifier tube having an anode, cathode and control electrode, a first, a second and a third resistor serially interconnecting one end of said output resistor with said anode, a source of potential, a load resistor connected between said potential source and said anode, a connection from the common terminal of said first and second resistors to said control electrode, a control tube having an anode connected to the common terminal of said second and third resistors and a cathode connected to the aforesaid cathode and to the other end of said output resistor, and means for impressing said AGC voltage on a control electrode of said control tube whereby the level of the sync pulses developed across said load resistor is maintained substantially constant.

2. In a television receiver, an input circuit, a channel supplied therefrom carrying picture modulation and sync pulses to a detector having an output resistor, said detector being so poled that negative going sync pulses are developed across said output resistor, a sync amplifier tube having anode, cathode and control electrodes, resistance means connecting one end of said output resistor to said anode, a source of potential, a load resistor connected between said potential source and said anode, a connection from one intermediate point on said resistance means to said control electrode, a connection from the other end of said output resistor to said cathode, and means for connecting a second intermediate point on said resistance to said cathode through a low impedance path only when signals at said input circuit are below a predetermined intensity whereby the level of the sync pulses developed across said load resistor is maintained substantially constant.

3. In a television receiver, an input circuit, a channel supplied therefrom carrying picture modulation and sync pulses to a detector having an output resistor, said detector being so poled that negative going sync pulses are developed across said output resistor, the circuit from said detector through said resistor being conductive to direct current, a sync amplifier tube having anode, cathode and control electrodes, resistance means connecting one end of said output resistor to said anode, a source of potential, a load resistor connected between said potential source and said anode, a connection from one intermediate point on said resistance means to said control electrode, a connection from the other end of said output resistor to said cathode, and means for connecting a second intermediate point on said resistance to said cathode through a low impedance path only when signals at said input circuit are below a predetermined intensity whereby the level of the sync pulses developed across said load resistor is maintained substantially constant.

4. In a television receiver, an input circuit, a channel supplied therefrom carrying picture modulation and sync pulses to a detector having an output resistor, said detector being so poled that negative going sync pulses are developed across said output resistor, means in said receiver deriving an AGC voltage from said input circuit, a sync amplifier tube having anode, cathod and control electrodes, resistance means connecting one end of said output resistor to said anode, a source of potential, a load resistor connected between said potential source and said anode, a connection from one intermediate point on said resistance means to said control electrode for applying said negative going sync pulses to said control electrode, a connection from the other end of said output resistor to said cathode, and means controlled by said AGC voltage for connecting and disconnecting a second intermediate point on said resistance means to said cathode so that the level of the sync pulses developed across said load resistor is maintained approximately constant.

5. In a television receiver, an input circuit, a channel carrying picture modulations and sync pulses and embodying a detector having an output resistor and deriving current from said input circuit, said detector being so poled that negative going sync pulses are developed across said output resistor, with the circuit from said detector through said output resistor being conductive to direct current, means in said receiver deriving an AGC voltage from said input circuit, a sync amplifier tube having anode, first cathode and control electrodes, resistance means connecting one end of said output resistor to said anode, a source of potential, a load resistor connected between said potential source and said anode, a connection from an intermediate point on said resistance means to said control electrode for applying said negative going sync pulses to said control electrode, a connection from the other end of said output resistor to said first cathode, and a control tube having an anode connected to a second intermediate point on said resistance means and a second cathode connected to said first cathode, said control tube having said AGC voltage impressed on a control electrode therein whereby the level of the sync pulses developed across said load resistor is maintained substantially constant.

6. In a television receiver, an input circuit, a channel carrying picture modulations and sync pulses and embodying a detector having an output resistor and deriving current from said input circuit, said detector being so poled that negative going sync pulses are developed across said output resistor, means in said receiver deriving an AGC voltage from said input circuit, a sync amplifier tube having anode, first cathode and control electrodes, resistance means connecting one end of said output resistor to said anode, a source of potential, a load resistor connected between said potential source and said anode, a connection from an intermediate point on said resistance means to said control electrode for applying said negative going sync pulses to said control electrode, a connection from the other end of said output resistor to said first cathode, and a control tube having an anode connected to a second intermediate point on said resistance means and a second cathode connected to said first cathode, and having said AGC voltage impressed on a control electrode therein whereby the level of the sync pulses developed across said load resistor is maintained approximately constant.

7. In a television receiver, an input circuit, a channel carrying picture modulations and sync pulses and embodying a detector having an output resistor and deriving current from said input circuit, said detector being so poled that negative going sync pulses are developed across said output resistor, means in said receiver deriving an AGC voltage from said input circuit, a sync amplifier tube having anode, cathode and control electrodes, resistance means connecting one end of said output resistor to said anode, a source of potential, a load resistor connected between said potential source and said anode, a connection from an intermediate point on said resistance means to said control electrode for applying said negative going sync pulses to said control electrode, a connection from the other end of said output resistor to said cathode, and means controlled by said AGC voltage for connecting and disconnecting a second intermediate point on said resistance means to said cathode so that the level of the sync pulses developed across said load resistor is maintained approximately constant.

References Cited in the file of this patent

UNITED STATES PATENTS

| | | |
|---|---|---|
| 2,402,096 | Somers | June 11, 1946 |
| 2,616,964 | Cohen | Nov. 4, 1952 |